United States Patent [19]

Victor

[11] Patent Number: 4,546,655
[45] Date of Patent: * Oct. 15, 1985

[54] FLOW MEASURING DEVICE WITH MULTIPLE-STATIC PRESSURE HOLES

[76] Inventor: Michael Victor, 41227 I-94 X-Way Service Dr., Van Buren Township, Belleville, Mich. 48111

[*] Notice: The portion of the term of this patent subsequent to Jan. 17, 2001 has been disclaimed.

[21] Appl. No.: 541,455

[22] Filed: Oct. 13, 1983

Related U.S. Application Data

[63] Continuation-in-part of Ser. No. 347,957, Feb. 11, 1982, Pat. No. 4,425,807.

[51] Int. Cl.$^4$ ............................................... G01F 1/46
[52] U.S. Cl. .................................................. 73/861.66
[58] Field of Search ................. 73/182, 861.65, 861.66

[56] References Cited

U.S. PATENT DOCUMENTS

| | | | |
|---|---|---|---|
| 1,508,017 | 9/1924 | Greve | 73/861.66 |
| 2,352,607 | 7/1944 | Alperin | 73/861.65 |
| 3,751,982 | 8/1973 | Lambert | 73/861.66 |
| 3,895,531 | 7/1975 | Lambert | 73/861.66 |
| 4,425,807 | 1/1984 | Victor | 73/861.65 |

*Primary Examiner*—Herbert Goldstein
*Attorney, Agent, or Firm*—Charles W. Chandler

[57] ABSTRACT

A flow-sensing pitot tube is disclosed for mounting in a conduit for indicating the rate of fluid flowing in the conduit. The tube has forward openings facing upstream for sensing dynamic pressure, and multiple static pressure sensing openings, including a pair disposed at an angle of 110 degrees rearwardly of the forward openings, for sensing static pressure. Pressures sensed by the forward and rear openings are used to indicate volumetric flow by using a flow coefficient that is substantially independent of the Reynolds Number of the fluid.

11 Claims, 5 Drawing Figures

FLOW MEASURING DEVICE WITH MULTIPLE-STATIC PRESSURE HOLES

CROSS-REFERENCE TO RELATED APPLICATIONS

This application is a continuation-in-part of U.S. application Ser. No. 347,957, filling date Feb. 11, 1982 and since issued Jan. 17, 1984 as U.S. Pat. No. 4,425,807 for a "Flow Measuring Device with Constant Flow Coefficient".

BACKGROUND OF THE INVENTION

This invention is related to pitot tubes adapted to sense both a dynamic pressure and a static pressure through a series of opening, and more particularly to a pitot tube having a circular exterior cross-section, an upstream, forward opening, and a plurality of rear openings, some of which are disposed at an angle about 110 degrees rearwardly of the forward dynamic opening and others at a greater rearward angle.

In my co-pending patent application, a novel pitot tube was disclosed which obviates some of the problems of conventional flow-sensing tubes in which the fluid pressure varies as it passes around the tube. My co-pending application disclosed a pitot tube having two side openings downstream of each forward opening, the side openings being located within a range of angles to provide a substantially constant flow coefficient throughout the normal usable range of fluid velocities, that is, a flow coefficient that is substantially independent of the fluid's Reynolds Number which is a function of the fluid passing through the conduit as well as its velocity.

SUMMARY OF THE INVENTION

The broad purpose of the present invention is to provide an improved pitot tube having a pair of side openings for sensing static pressure and disposed about 110 degrees rearward of the forward, dynamic opening, and additional static pressure sensing openings disposed rearwardly of the two side openings.

In one embodiment of the invention, the additional rear opening is disposed 180 degrees rearward of the forward opening. In another embodiment of the invention, two rear openings are disposed at angles of about 150 degrees on opposite sides of and rearward of the forward opening. The tube body is internally divided into a pair of longitudinal chambers. The dynamic pressure sensing opening is fluidly connected with the forward chamber while the rearward, static pressure sensing openings are connected with the second, rear chamber. It has been found that the coefficient for computing volumetric flow through a conduit is much more uniform for certain Reynolds Numbers using applicant's pitot tube rather than conventional pitot tubes. For example, as is well known, there is considerable amount of turbulance created as a fluid passes around a 90 degree elbow. Conventional practice is to mount the pitot tube several diameters down stream of the elbow to obtain an acceptable reading. The preferred embodiment of the present invention permits acceptable readings to be achieved even though the pitot tube is as close as a distance a single conduit diameter from the centerline of the conduit elbow. This provides a special advantage because it reduces the amount of piping necessary to achieve an acceptable flow reading.

Further, conventional pitot tubes have a forward dynamic pressure opening and a static pressure sensing opening 180 degrees rearward of the forward opening. Such tubes experience problems in steam flow because condensate tends to develop on the downstream face of the tube. As the condensate evaporates, scale builds up plugging the downstream opening. Providing the static holes along the side of the tube reduces any tendency of the openings to become plugged and thus maintains the reliability of the flow readings over a longer period of time.

Still further objects and advantages of the invention will become readily apparent to those skilled in the art to which the invention pertains upon reference to the following detailed description.

DESCRIPTION OF THE DRAWINGS

The description refers to the accompanying drawings in which reference characters refer to like parts throughout the several views, and in which.

DESCRIPTION OF THE PREFERRED EMBODIMENT

Figure 1:
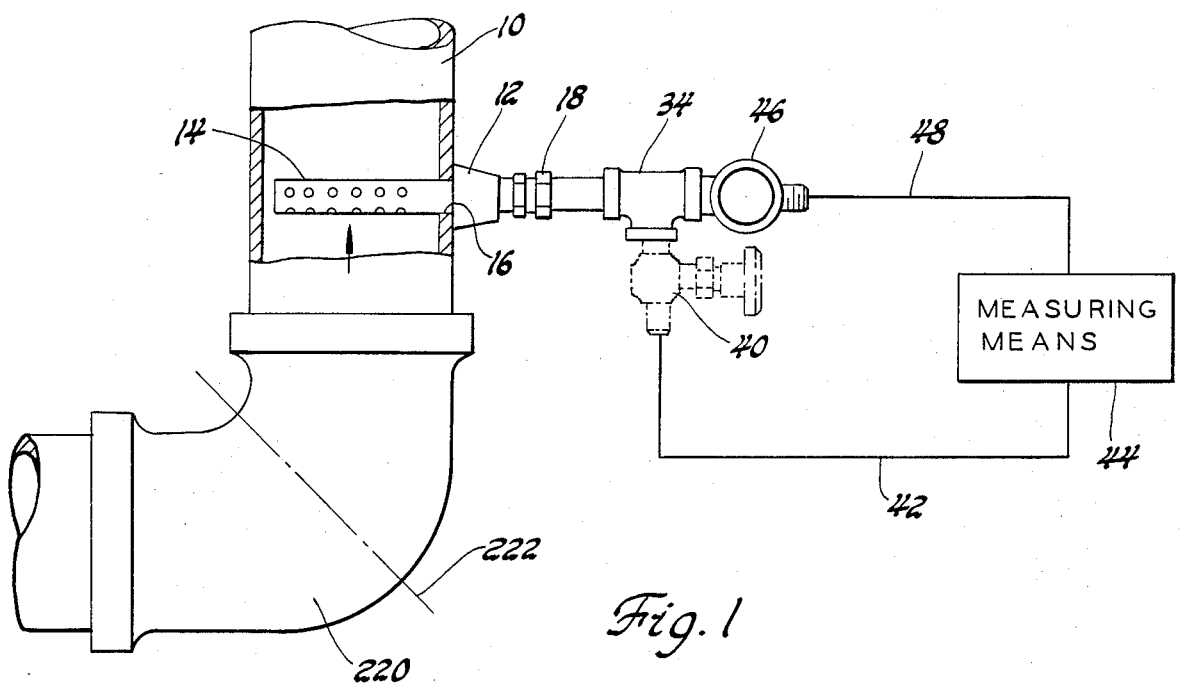
FIG. 1 is a fragmentary partially schematic view of a flow-sensing tube mounted in a conduit adjacent an elbow for measuring fluid flow in accordance with the present invention.

Referring to the drawings, FIG. 1 illustrates a conduit 10 for delivering a fluid such as a gas in the direction of the arrow. Collar 12 is welded to one side of the conduit. Flow sensing tube 14 is received in the collar through opening 16 to extend into the conduit transversely to fluid flow therein. Nut means 18 block and seal the flow sensing tube in position.

Figure 2:
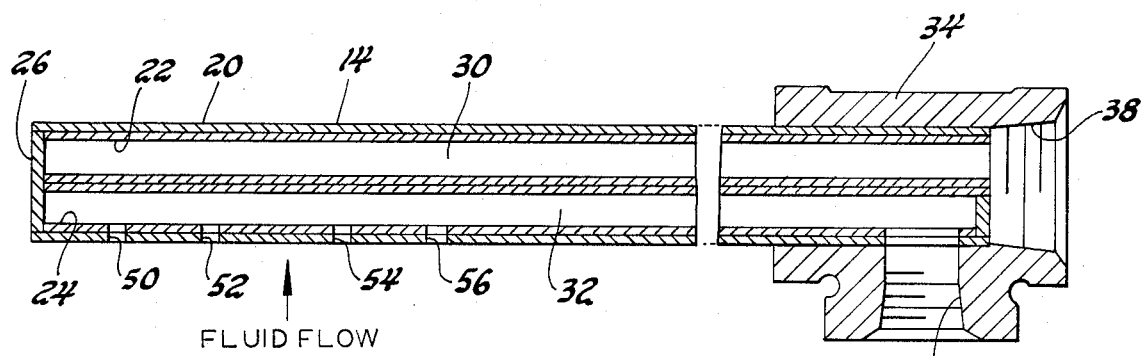
FIG. 2 is a longitudinal sectional view through the pitot tube of FIG. 1.

FIG. 2 illustrates the internal structure of tube 14. Tube 14 has a tubular housing 20 with a circular cross-section. A pair of "D" shaped tubes 22 and 24 are disposed back to back in housing 20. Plug 24 blocks one end of housing 20 and plug 28 blocks the opposite end of tube 24. The arrangement forms a pair of "D" shaped elongated, internal chambers 30 and 32.

A T-shaped conduit 34 is mounted on the end of housing 14. Conduit 34 has a threaded opening 36 in communication with chamber 32 and a threaded opening 38 in communication with chamber 30.

Referring to FIG. 1, in use, valve 40 is mounted on conduit 34 and connected by conduit means 42 to measuring means 44 which senses the pressure in chamber 32 through opening 36. A second valve 46 is mounted on conduit 34 and connected by conduit means 48 to measuring means 44 for sensing the pressure in chamber 30 through opening 38. Measuring means 44 is adapted to compute the volumetric flow rate through conduit 10 depending upon the relationship between the pressures in chambers 30 and 32.

Figure 3:
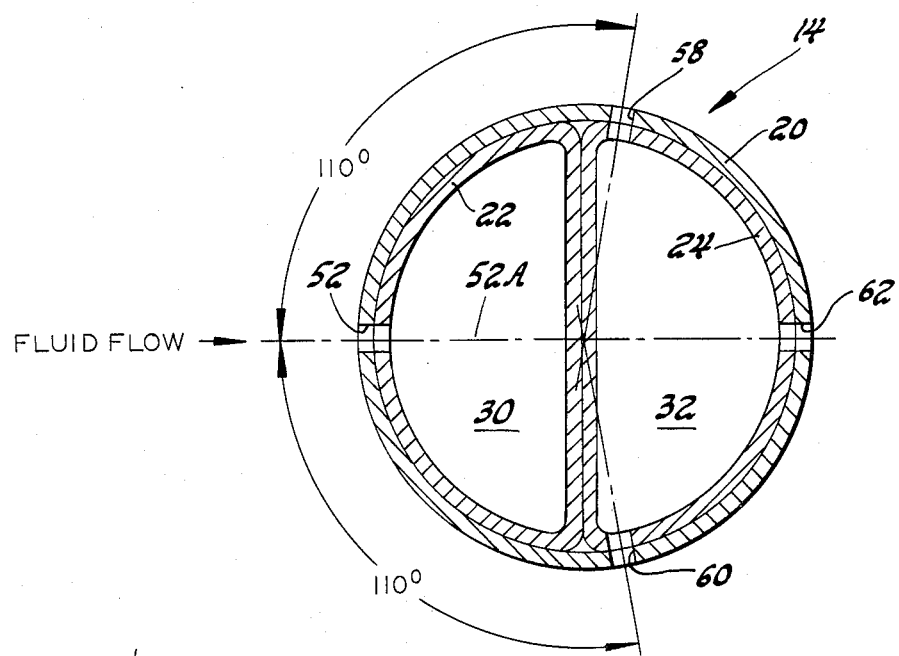
FIG. 3 is a enlarged sectional view through the pitot tube of FIG. 1.

Housing 14 and tube 24 have longitudinally spaced forward openings 50, 52 and 54 and 56 supported to face in the upstream direction to serve the dynamic fluid pressure as it passes about the tube. The flow-sensing tube has a pair of side openings 58 and 60 disposed rearwardly of each forward opening for sensing the static pressure of the fluid, as best illustrated in FIG. 3. Opening 58 is preferably formed 110 degrees rearwardly of radial axis 52A of forward opening 52, while opening 60 is preferrably formed 110 degrees rearwardly of radial axis 52A, but in the opposite direction. Both openings 58 and 60 extend through housing 20 and tube 24 to fluidly communicate with chamber 32.

Pitot tube 14 also has a third, rearward opening 62 for sensing static pressure, the pressure on the downstream side of the tube. Opening 62 is disposed 180 degrees rearwardly of forward opening 52, that is on the same axis 52A as the forward opening. Thus, there are three static openings for sensing static pressure for each opening for sensing the dynamic pressure with respect to the pitot tube.

Figure 4:
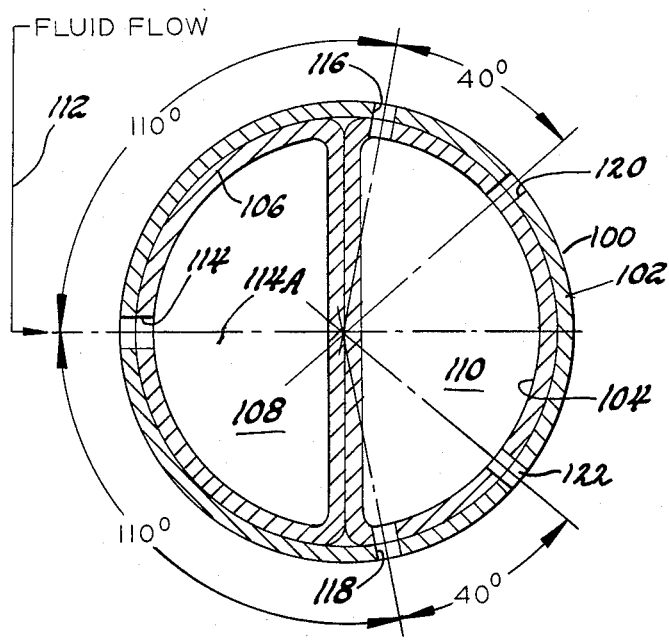
FIG. 4 is a cross-sectional view of a flow-sensing tube illustrating another embodiment of the invention.

FIG. 4 illustrates another embodiment of the invention in which pitot tube 100 has an outer housing 102 identical to housing 20 of FIG. 3 except for the static openings, an inner tubular housing 104 identical to housing 24 except for the location of the static openings and tubular housing 106 identical to housing 22 of the embodiment of FIG. 3. Housings 104 and 106 each have a "D" shaped cross-section forming a pair of elongated "D" shaped chambers 108 and 110. Chamber 108 is on the upstream side for sensing fluid flowing in the direction of arrow 112, while chamber 110 is on the downstream side of the tube.

Pitot tube 100 has an opening 114 on radial centerline 114A for sensing the dynamic pressure of the fluid flow. Opening 114 is identical to opening 52 in the embodiment of FIG. 3. The pitot tube also has a pair of downstream openings 116 and 118 which are preferably 110 degrees rearward of forward opening 114 but on opposite sides thereof. Side openings 116 and 118, although illustrated as being 110 degrees rearward of the forward opening, could each be within a range of about 105–115 degrees rearward of the forward opening.

In addition, pitot tube 100 has a second pair of rearward openings 120 and 122. Openings 120 and 122 also sense the static pressure around the pitot tube and are in communication with chamber 110. Opening 120 is preferrably formed on a radial centerline 40 degrees rearward of opening 116, while opening 122 is formed on a radial centerline 40 degrees rearward of opening 118.

Figure 5:
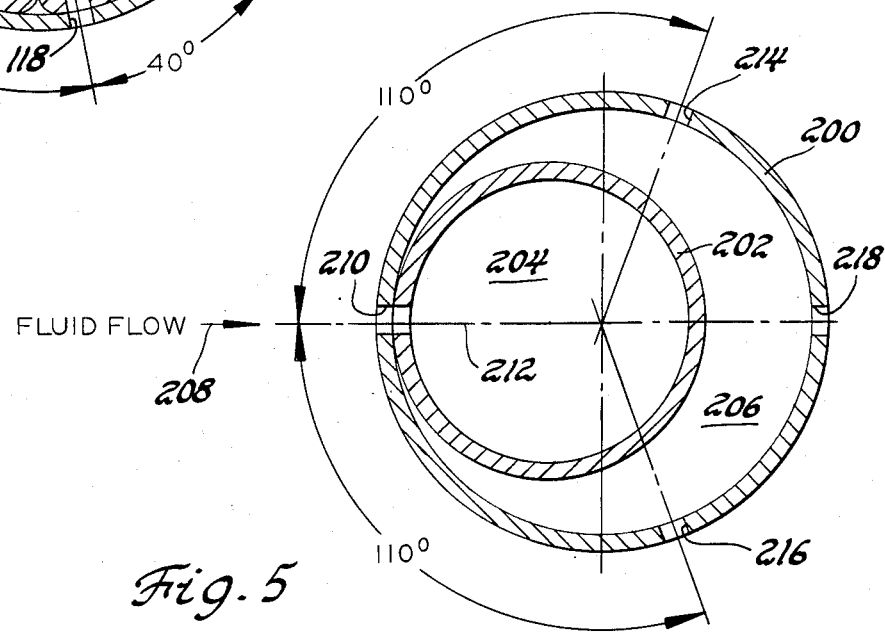
FIG. 5 is a cross-sectional view of another flow-sensing tube illustrating still another embodiment of the invention.

FIG. 5 illustrates still another embodiment of the invention comprising a tubular pitot tube housing 200 having its ends formed in a manner similar to housing 14. Housing 200 has a circular cross-section. A second, smaller housing 202 having a circular cross-section, is mounted in housing 200. The two housings form a pair of internal chambers 204 and 206 respectively. Chamber 204 senses the dynamic pressure of fluid flow moving in the direction of arrow 208 while chamber 206 is adapted to sense the downstream, static pressure of the fluid. Pitot tube 200 has opening 210 formed on radial centerline 212 of tube 200. Opening 210 is adapted to sense the upstream or dynamic pressure of the fluid. Tube 200 also has a pair of downstream, static openings 214 and 216 located respectively 110 degrees rearwardly of opening 210. In addition, tube 200 has a third opening 218 located 180 degrees rearwardly of upstream opening 210. Thus pitot tube 200 has three downstream openings for sensing the static pressure of the fluid for each upstream opening 210.

The advantage of the tubes illustrated in FIGS. 3, 4 and 5 is that each pitot tube is insensitive to a wider range of Reynolds Numbers so as to provide a relatively uniform flow coefficient that does not fluctuate with the Reynolds Number and the fluid velocity. For example, it is common practice to mount a pitot tube several diameters downstream from an elbow in a conduit. Referring to FIG. 1, elbow 220 is fastened to conduit 10. In this case pitot tube 14 can be mounted as closely as a distance equal to one diameter of the conduit from centerline 222 of the elbow and obtain a reliable indication of the flow rate.

It is apparent that flow sensing tubes having other wall configurations forming a pair of internal chambers can be employed provided the cross-section of the outer housing is circular and there is a side opening within the range of 105 degrees to 115 degrees rearwardly of the forward opening.

Having described my invention, I claim:

1. A flow-sensing tube means supported transversely to fluid flowing in a conduit for measuring differential flow pressure, comprising:

a hollow, elongated tubular member having a wall with a circular exterior cross section;

wall means in said tubular member forming a first chamber and a second chamber;

first flow-sensing opening means in the wall of said tubular member opening in a first radial direction and fluidly connected to the first chamber;

second flow-sensing opening means in the wall of said tubular member opening in a second radial direction and fluidly connected to the second chamber, the second opening means being disposed on a radial axis forming a first angle greater than 105 degrees but less than 115 degrees with respect to a radial axis passing through the first opening means;

third flow-sensing opening means in the wall of the tubular member opening in a third radial direction and fluidly connected to the second chamber, the third opening means being disposed on a radial axis forming an angle greater than said first angle with respect to the radial axis passing through the first opening means;

means for mounting the tubular member in the conduit in the path of fluid flow such that the first opening means faces upstream of the fluid flow; and means for fluidly connecting each of said chambers to a measuring means.

2. A combination as defined in claim 1, in which the second opening means is disposed on a radial axis disposed at an angle of about 110 degrees rearward of the radial axis passing through the first opening means.

3. A combination as defined in claim 1, including fourth opening means fluidly connected to the second chamber, the fourth opening means being formed in the wall of said tubular member on a radial axis forming an angle greater than 105 degrees, but less than 115 degrees with respect to the radial axis passing through the first opening means.

4. A combination as defined in claim 3, in which the fourth opening means are disposed at an angle of about 110 degrees with respect to the first opening means, but in the opposite direction with respect to the second opening means.

5. A combination as defined in claim 1, in which the third opening means are disposed on a radial axis forming an angle of 180 degrees with respect to the front opening means.

6. A combination as defined in claim 1, in which the third opening means comprises a plurality of circumferentially spaced openings disposed rearwardly of the first opening means.

7. A combination as defined in claim 1, in which the first opening means comprises a plurality of openings having a combined cross sectional area less than the transverse cross sectional area of the first chamber, and the sum of the cross sectional areas of the second opening means is less than the transverse cross sectional area of the second chamber.

8. A combination as defined in claim 1, in which the wall means in the tubular member form a pair of D-shaped chambers disposed back-to-back.

9. A combination as defined in claim 1, including a pair of D-shaped tubes disposed in the tubular member, said D-shaped tubes being disposed back-to-back to form said first chamber and said second chamber.

10. A combination as defined in claim 1, in which the wall means comprises an inner, elongated substantially circular tube disposed in the first mentioned tubular member, the inner tube forming said first chamber.

11. A flow-sensing tube adapted to be supported transversely to fluid flowing in a conduit for measuring differential flow pressure, comprising:
a hollow, elongated tubular member having a wall with an exterior circular cross section;
wall means in said tubular member forming a first chamber and a second chamber;
first flow-sensing opening means in the wall of said tubular member facing in a first radial directon and fluidly connected to the first chamber; and
a plurality of second flow-sensing opening means in the wall of the tubular member each facing in a rearward radial direction and fluidly connected to the second chamber, at least two of the second opening means being formed on circumferentially spaced radial axes, each axis forming an angle between 105 and 180 degrees rearwardly of the forward opening means such that when the tube is disposed in a conduit in the path of fluid flow with the first opening means upstream of the flow of fluid, measuring means connected to the first chamber and the second chamber are operative to compute the volumetric flow in the conduit employing a flow coefficient that is substantially independent of the Reynold's number of the fluid.

* * * * *